March 27, 1934.  J. M. KELLEY  1,952,440
THERMOSTATIC CONTROL
Filed July 28, 1932  3 Sheets-Sheet 1
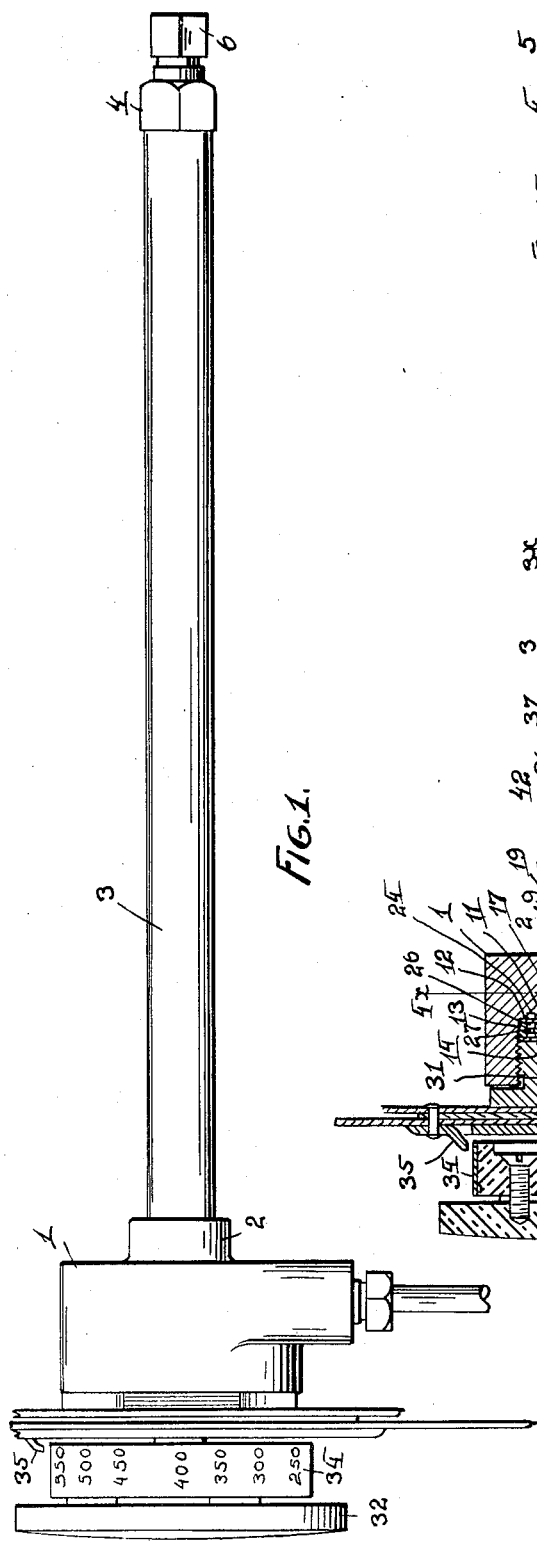
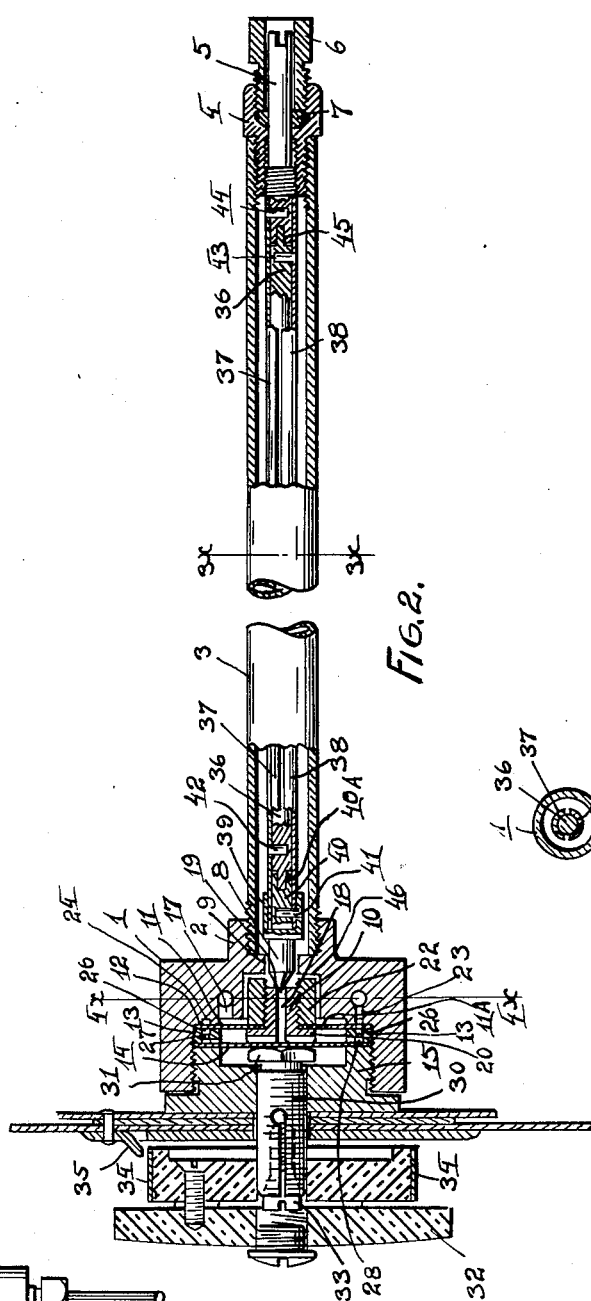
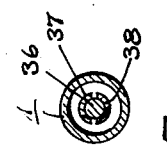
INVENTOR
John M. Kelley
BY
ATTORNEY

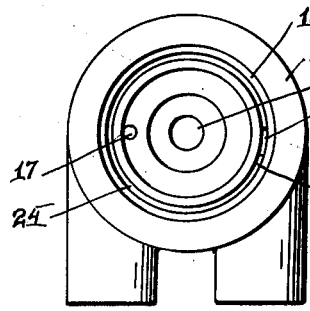
FIG.5.
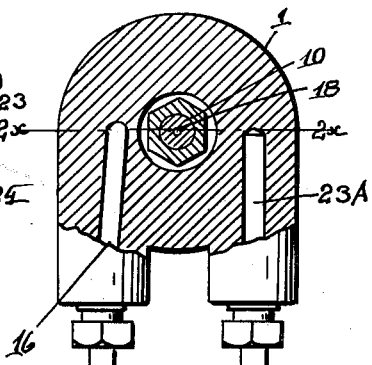
FIG.6.
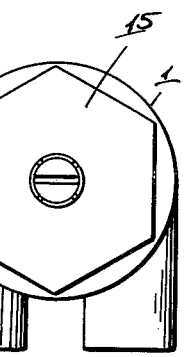
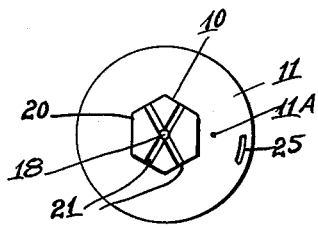
FIG.7.
FIG.8.
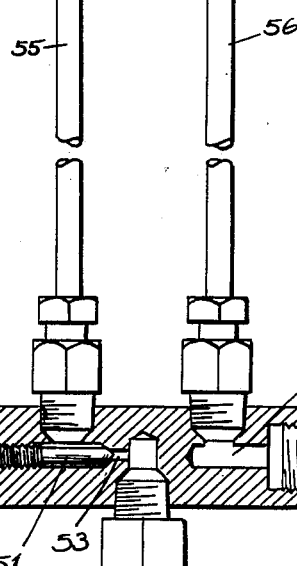
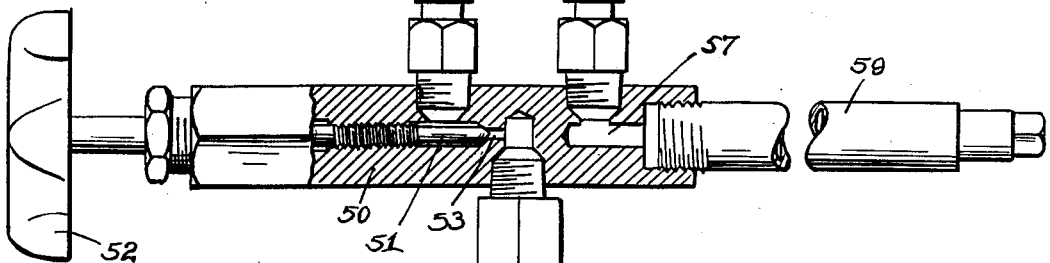
FIG.4.
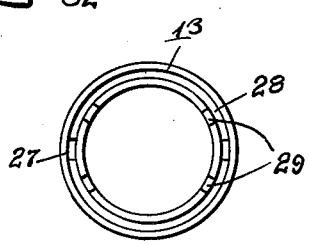
FIG.9.
FIG.10.
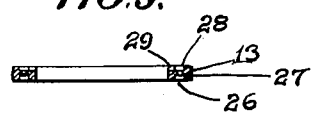
FIG.11.
INVENTOR
John M. Kelley
BY
ATTORNEY March 27, 1934.  J. M. KELLEY  1,952,440
THERMOSTATIC CONTROL
Filed July 28, 1932  3 Sheets-Sheet 3
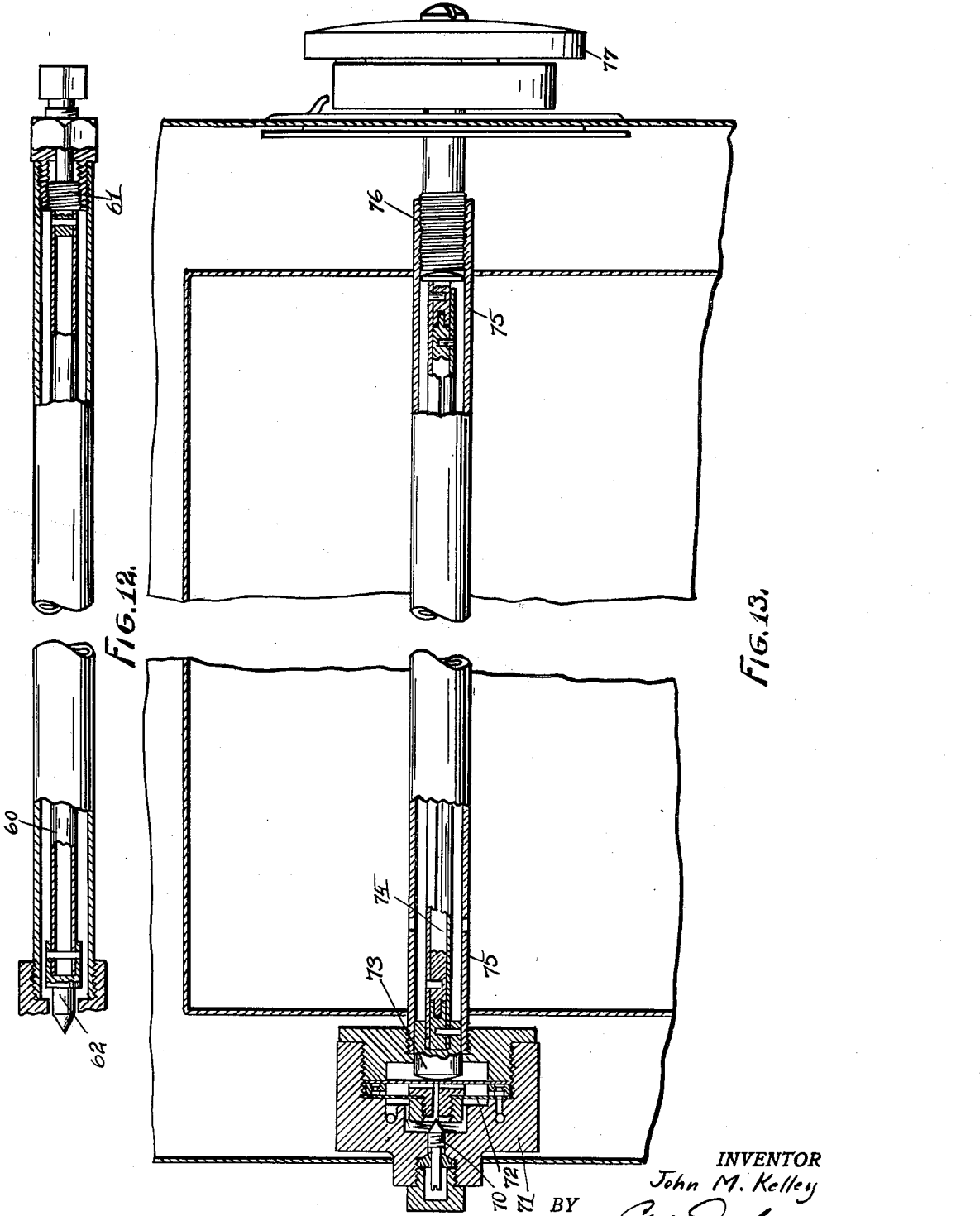
INVENTOR
John M. Kelley
BY
ATTORNEY Patented Mar. 27, 1934

1,952,440

UNITED STATES PATENT OFFICE 1,952,440

THERMOSTATIC CONTROL

John M. Kelley, Rochester, N. Y.

Application July 28, 1932, Serial No. 625,551

10 Claims. (Cl. 236—102)

This invention relates to thermostatic temperature controls for ovens etc., and has for its object to provide a novel construction for such a control to make it especially adaptable for use with burners operated by "wet" gases.

This and other objects of this invention will become more readily apparent from a detailed description of the invention which follows, reference being had to the accompanying drawings in which Figure 1 is a side elevation of my improved thermostatic control.

Figure 2 is a longitudinal sectional view of the control, the section being taken on the line 2x—2x of Figure 4.

Figure 3 is a cross section of the thermostatic operating member of the control and the housing surrounding it, the section being taken on the line 3x—3x of Figure 2.

Figure 4 is a partial sectional view of the valve housing of the thermostatically controlled valve and the hand operated valve which controls the flow of the gas to and from the control, showing the connection between them and the drier tube.

Figure 5 is an end elevation of the valve housing of the thermostatically controlled valve with parts of the valve removed from it.

Figure 6 is an end elevation of the valve housing of the thermostatically controlled valve with the adjusting wheel removed from it.

Figure 7 is a detail view of one side of the diaphragm valve member of the control.

Figure 8 is a detail view of the other side of the diaphragm valve member of the control.

Figure 9 is a detail view of one side of the spacing ring between the diaphragm valve member and the adjustable diaphragm member of the control.

Figure 10 is a detail view of the other side of the spacing ring.

Figure 11 is a cross section of the spacing ring, the section being taken on the line 11x—11x of Figure 10.

Figure 12 is a partial side elevation and longitudinal sectional view of a modified form of the thermostatic operating member.

Figure 13 is a longitudinal sectional view of a modified form of the thermostatic control and the portion of the oven in which it is mounted.

In the several figures of the drawings like reference numerals indicate like parts.

The thermostatically controlled control forming the subject matter of my present invention is especially adapted for use with a burner in which "wet" gas is burned. Such gas has characteristics which are not present in a dry gas and an oven control which operates with dry gas can therefore not be used to also operate with wet gas.

As illustrated in the several figures, the oven control comprises a housing 1 which has a central boss 2 on one side thereof into which is threaded the tubular casing 3. This casing has the bushing 4 threaded into the end thereof and into the inner end of this bushing in turn is threaded the end stem 5 of the thermostatic operating member. The outer reduced portion of this end stem 5 projects into the bushing 6 which is threaded into the outer end of the first bushing 4 and is adapted to compress the compression sleeve 7 which surrounds the end stem 5 within the bushing 4 in order to provide a gas and liquid tight adjustable joint around the stem.

The threaded engagement of the end stem of the thermostatic member into the bushing 4 centrally supports this member within the cylindrical casing so that the needle valve member 8, provided at the opposite end of the thermostatic member, projects thru the central opening 9 in the housing to cooperate with the diaphragm supported valve member 10. The edge of the diaphragm 11 of this valve member is held against the annular shoulder 12 by the spacing ring 13, against which is placed a second diaphragm 14. The latter diaphragm is held against the spacing ring by the annular inner end of the cover 15 which is threaded into the housing 1 to force the diaphragm 14 against the spacing ring 13, the spacing ring against the diaphragm 11 and the latter diaphragm against the annular shoulder 12 in order to provide a gas and liquid tight joint between these members and permit the gas only to pass thru the ports provided in the diaphragm 11 and the spacing ring 13 as will hereinafter be described.

The inlet 16 of the housing 1 leads to the port opening 17 which is located on the inside of the housing surrounded by the annular shoulder 12. The gas thus enters the inside of the housing behind the diaphragm 11. This diaphragm carries the valve member 10 which has a central duct 18 thru the center of it with the needle valve seat 19 provided at one end thereof on one side of the diaphragm. At the other side of the diaphragm the valve member is provided with a head 20 having radial grooves 21 leading from the end of the central duct thereof. A nut 22 threaded on the valve member 10 clamps the valve member to the diaphragm. The flow of the gas entering the inside of the housing thru the opening 17 of the inlet 16 is thus controlled by the needle valve member 8 which cooperates with the valve seat 19 in the valve member 10. Gas passing thru the duct 18 of the valve member 10 enters the space between the diaphragm 11 and the diaphragm 14. This space is connected with the port opening 23 of the outlet 23A. This port opening is located in an annular groove 24 provided in the face of the annular shoulder 12 within the housing 1. The diaphragm 11 has a port opening 25 provided therein which connects the annular groove 24 with the annular concentric groove 26 provided on one side of the spacing ring 13. The spacing ring in turn has a port opening 27 which connects the annular groove 26 provided on one side of the ring with an annular groove 28 provided on the other side of the ring and radial grooves 29 leading from the annular groove 28 to the space between the two diaphragms connect the annular groove 28 with the inside of the housing between the two diaphragms and permit the gas to flow thru the grooves and ports to the outlet 23A.

The diaphragm 14 forms a variable stop for the valve member 10 which is adjusted by the stem 30 which is mounted in the cover 15 and is adapted to be threaded back and forth therein to move the head 31 provided on the inner end thereof toward and away from the diaphragm 14. For the lateral adjustment of the head 31, the stem 30 has the hand wheel 32 threaded to the outer end thereof and in order to provide an angular adjustment for the hand wheel 32 on the stem 30, the outer end of the stem 30 is split and has a plug 33 threaded into the split end to permit the expansion of the stem in order to lock the hand wheel in any desired angular position to the stem. The hand wheel is preferably made of an outer and inner section, which sections are suitably spaced apart to permit the circulation of air between them and prevent the outer portion of the hand wheel from getting hot. Fastened to the periphery of the inner section of the hand wheel 32 is the dial strip 34 on which the degrees of heat are indicated at which the oven may be operated by the oven control. A fixed pointer 35 projecting from a suitable disc mounted on the side of the oven cooperates with the dial strip for the setting of the dial of the hand wheel.

The automatic operation of the oven control is performed by the thermostatic member located in the casing 3 which is mounted to project into the oven so that it will be heated to the same temperature as that of the inside of the oven. As previously described, the thermostatic member has an end stem 5 which is adjustably anchored in the inner end of the casing 3 to support the thermostatic member within the casing. The thermostatic member proper comprises a steel rod 36 which is surrounded by two copper strips 37 and 38 which extend parallel to each other and the rod 36. The copper strips are preferably concaved so as to encircle the rod at opposite sides thereof. The needle valve member 8 of the thermostatic member is provided at the rear with an extension sleeve 39 having a center pin 40 provided therein and the inner ends of the two copper strips 37 and 38 engage into this sleeve extension around the center pin 40 thereof. The end of the copper strip 38 is anchored to the sleeve and its center pin by means of pin 41 and thus forms an integral extension of the needle valve member 8. The end of the other copper strip 37, which also engages into the extension sleeve 39, does not extend to the inner end of the sleeve extension and is not attached thereto so that it is free to move within the sleeve extension. This second copper strip is however attached to the end of the steel rod 36 by means of the pin 42. A tongue and groove connection 40A between the inner end of the steel rod and the center pin of the extension sleeve permits the steel rod to move toward and away from the center pin 40 while being held in line with each other by the copper strips which surround both of them.

At the other end of the thermostatic expansion member the copper strip 38 is attached to the end of the steel rod 36 by means of the pin 43, while the end of the copper strip 37 is attached to the inner end of the end stem 5 by means of the pin 44. A tongue and groove connection 45 between the inner end of the end stem 5 and the outer end of the steel rod 36 permits the outer end of the steel rod to move toward and away from the inner end of the end stem 5 while being held in line with each other by the copper strips 37 and 38 which surround both of them.

The expansion member thus built up operates as follows: The heat of the oven expands the copper strip 37 which is anchored to the fixed end stem 5 at the outer end of the casing. This expansion of the copper strip 37 lengthens it so that its opposite free end moves into the sleeve extension of the needle valve member 8. In doing so the copper expansion strip 37 carries with it the steel rod 36 which is attached thereto near the needle valve member. The movement of the outer end of the copper expansion strip 37, due to its expansion, is then transmitted by the steel rod 36 to the second copper expansion strip 38 near the outer end of the casing 3 where this steel rod is attached to the second expansion strip by means of the pin 43. This second expansion strip is thus moved away from the end stem 5 but to this movement is added the expansion of the second expansion strip so that the needle valve member 8 attached to the inner end of the second expansion strip is moved a distance equal to the expansion of both of the expansion strips. The steel rod 36, which connects the two expansion strips 37 and 38, is also expanded by the heat of the oven but its expansion is nullified by the expansion of the steel casing which surrounds the thermostatic member and is made so as to have practically the same expansion as the steel rod 36.

The expansion and contraction of the thermostatic member thus operates to move the needle valve member 8 thereof toward and away from the valve member 10 carried by the diaphragm 11 and the adjustable anchorage of the thermostatic member provided by the threaded engagement of the end stem 5 in the outer end of the casing 3 permits the expansion members to be set so that their expansion and contraction at different temperatures will operate to regulate the flow of gas thru the duct 18 in the diaphragm supported valve member 10.

The position of the valve member 10 with relation to the needle valve member 8 is varied so that the expansion and contraction of the thermostatic member can be made to open and close the duct 18 at various predetermined temperatures of the oven. For example the valve member may be set so that the expansion of the thermostatic member will close the duct 18 so that only an amount of gas sufficient to keep the oven heated to a temperature of 250 degrees Fahrenheit can pass thru this duct. Another setting of the valve member will allow sufficient gas to flow thru the duct 18 to heat the oven to a temperature of 500 degrees Fahrenheit. This setting of the valve member is done by the hand wheel 32 which, when rotated, threads the stem 30 in and out of the cover of the housing 1 and moves the head 31 to flex the diaphragm toward the head 20 of the valve member 10 or allows it to flex away from it. The head 31 thus forms an adjustable stop against which the diaphragm 14 rests in order to provide a fixed backing for the valve member 10 of the diaphragm 11. By rotating the hand wheel 32 so that the pointer 35 points to 250 on the dial strip 34 thereof, the head 33 flexes the diaphragm 14 to move the diaphragm supported valve member 10 toward the needle valve to back it up in a position where the expansion of the thermostatic member will close the duct 18 on the expansion of the expansion strips at 250 degrees Fahrenheit. A setting of the hand wheel in which the pointer 35 points to 500 on the dial strip will move the head 32 back so that the diaphragm 14 can flex back and allow the diaphragm supported valve member 10 to flex back with it so that it will not be backed up by the head 31 until sufficient gas has passed thru the duct which will produce a temperature of 500 degrees Fahrenheit before the expansion of the thermostatic member closes the duct 18.

To prevent the valve member from being forced against the needle valve member, which would cause the thermostatic member to buckle, a shoulder 46 is provided in the housing 1 which stops the movement of the valve member 10 so that it cannot be unduly forced against the needle valve member.

For the purpose of permitting a small quantity of gas to pass thru the thermostatic valve sufficient to keep a standby flame lit in the burner when the flow of gas is otherwise shut off, a small port 11A is provided in the diaphragm 11 which by-passes a small quantity of gas to pass around the valve member 10 and keeps the burner operating with a small flame after the valve is otherwise closed. In this way the flame of the burner will never be completely extinguished by the operation of the thermostatic member but will simply be reduced to a minimum to be again increased as soon as the temperature in the oven begins to drop below the desired point.

The valve with which the gas is manually regulated before it enters the oven control is illustrated in Figure 4 and comprises the valve body 50 in which the needle valve 51 is mounted. This needle valve is operated by the handle 52 and operates to open and close the port 53 thru which the gas enters from the gas line 54. After passing thru the port 53 the gas passes out thru the gas line 55 into the inlet 16 of the oven control heretofore described. The gas leaves the oven control thru the outlet 23A and flows thru the pipe line 56 back to the valve body 50 into the open end duct 57 thereof into which the drier tube 59 is threaded. This drier tube acts as a pressure equalizing chamber from which the dry gases are allowed to pass on to the burner while any wet gases may accumulate therein until dried either by a fixing flame, which is adapted to heat the tube, or by the dry gases which pass over the wet gas in their flow to the burner.

In Figure 12 I have illustrated a modified form of the thermostatic member for the operation of the oven control. In this modification the expansion member 60 comprises a tube made up of metal suitable because of its coefficient of expansion. This tube is fixedly attached to the adjustable end stem 61 with one end thereof while the opposite free end has the needle valve member 62 attached thereto.

The modification of the oven control illustrated in Figure 13 is adapted for use in ovens in which the control must be set by a hand wheel located in the opposite wall of the oven. In this modification an adjustable but otherwise fixed needle valve member 70 is mounted in the housing 71 to cooperate with the diaphragm supported valve member 72. The diaphragm controlled valve member is adjusted; that is held against yielding at a predetermined position by a plug 73 carried on the end of the expansion member 74. This plug projects from the end of the casing 75 in which the expansion member 74 is mounted and closes the space in the end of the casing. The casing extends from one wall of the oven to the other and in the opposite end has the stem 76 threaded therein. This stem is rotated by the hand wheel 77 which corresponds to the hand wheel 32 in Figures 1 and 2. The end of the stem 76 engages the end of the expansion member 74 so that in threading the stem 76 back and forth in the end of the casing 75 the motion of this stem is transmitted thru the expansion member to the plug 73 which in turn moves the diaphragm 78 for the proper setting of the valve member 72.

I claim:

1. In a thermostatic control the combination of a valve housing, a pair of diaphragms mounted within said housing in spaced relation to each other to form a chamber having flexible walls, a valve member carried by one of said diaphragms, said valve member having a duct leading therethru to provide an inlet into said chamber, said valve housing having an inlet on the outside of said chamber, thermostatic means cooperating with said diaphragm supported valve member to control the flow of gas from said inlet of said housing into said chamber and an outlet from said diaphragm chamber.

2. In a thermostatic control the combination of a valve housing, a pair of diaphragms mounted within said housing in spaced relation to each other forming a chamber between them, a valve member having a duct leading therethru carried by one of said diaphragms, said valve housing having an inlet on the outside of said chamber, thermostatic means cooperating with said diaphragm supported valve member to control the flow of gas into said chamber and an outlet from said diaphragm chamber, and an adjustable member on the outside of the other of said diaphragms adapted to hold said second diaphragm against said valve member of said first diaphragm to prevent the flexing of said first diaphragm by said thermostatic means beyond a predetermined point.

3. In a thermostatic control the combination of a thermostatic member comprising a central supporting and connecting rod, a pair of expansion strips, one of said expansion strips being fastened to one end of said supporting and connecting rod and the other of said expansion strips being fastened to the opposite end of said supporting and connecting rod, anchoring means connected to the free end of one of said expansion strips and a valve member connected to the free end of the other of said expansion strips.

4. In a thermostatic control the combination of a thermostatic member comprising a central supporting and connecting rod, a pair of expansion strips, one of said expansion strips being fastened to one end of said supporting and connecting rod and the other of said expansion strips being fastened to the opposite end of said supporting and connecting rod, anchoring means connected to the free end of one of said expansion strips, a valve member connected to the free end of the other of said expansion strips and a slip joint between said anchoring means and one end of said supporting and connecting rod and a slip joint between said valve member and the other end of said supporting and connecting rod.

5. In a thermostatic control the combination of a valve housing, a tubular casing projecting from said housing, a bushing mounted in the outer end of said casing, an anchoring member mounted in said bushing, a thermostat member comprising a pair of expansion strips, one of said expansion members having one end thereof attached to said anchoring means, a valve member attached to the opposite end of the other of said expansion strips, supporting and connecting means connecting said anchoring means with said valve member, a slip joint providing a lost motion between said connecting means and said anchoring means at each end of said connecting means and a valve member in said valve housing cooperating with said valve member attached to one of said expansion strips.

6. In a thermostatic control the combination of a valve housing, a pair of diaphragms within said housing, a spacing ring separating said diaphragms to form a chamber between them, a valve member having a duct leading therethru carried by one of said diaphragms and providing an inlet for said chamber, an outlet port in said same diaphragm, said spacing ring having a duct therein leading from said chamber to said outlet port in said diaphragm, a stop for the movement of said diaphragm supported valve member on the outside of said second diaphragm and a second stop for said diaphragm supported valve member in front of said first diaphragm, and a thermostatically controlled valve cooperating with said diaphragm supported valve member to control the flow of gas thru said duct in said diaphragm supported valve member.

7. In a thermostatic control the combination of a valve housing having a central opening therethru, an annular shoulder surrounding the opening at one end of said housing, a thermostatically controlled valve member projecting into the opening surrounded by said annular shoulder, a diaphragm supported valve member mounted within said housing and cooperating with said thermostatically controlled valve member, said annular shoulder forming a stop for said diaphragm supported valve member in its movement toward said thermostatically controlled valve member.

8. In a thermostatic control, the combination of a valve housing, an annular shoulder within said housing having an annular concentric groove in the face thereof with an outlet port leading from said groove rearwardly of said shoulder, a diaphragm having an outlet port in registry with said outlet port in said shoulder, a valve member having a duct leading therethru mounted centrally of said diaphragm, said housing having an inlet port in the space surrounded by said annular shoulder and surrounding said valve member on one side of said diaphragm, a thermostatically controlled valve member projecting into said space toward said valve member to cooperate with the duct therein to open and close one end thereof, a spacing ring having concentric annular grooves on each side thereof connected by a duct leading thru said ring from one duct to the other and with a radial groove leading from one of said annular grooves to the open center, said spacing ring resting against said diaphragm at a point opposite to said annular shoulder, a second diaphragm resting against said spacing ring and a cover threaded into said housing to force said second diaphragm against said spacing ring and said first diaphragm against said annular shoulder to provide gas tight joints between said shoulder and said first diaphragm and between said spacing ring and said first and second diaphragm.

9. In a thermostatic control the combination of a valve housing, a chamber having flexible walls within said housing, a combined inlet and valve member carried by one of the flexible walls of said chamber and valve means cooperating with said valve member to control the flow of gas from said housing into said chamber and stop means cooperating with another of said flexible walls to limit the movement of said flexible wall carrying said valve member.

10. In a thermostatic control the combination of a valve housing, a chamber having opposing flexible walls within said housing, a combined inlet and valve member carried by one of said flexible walls, fixed stop means for limiting the movement of said flexible wall carrying said valve member in one direction and variable stop means cooperating with the opposing flexible wall for limiting the movement of said flexible wall carrying said valve member in the opposite direction.

JOHN M. KELLEY.